(12) United States Patent
Messick, Jr.

(10) Patent No.: US 6,530,469 B2
(45) Date of Patent: Mar. 11, 2003

(54) WIRE BELT WITH COMPOUND LINK FORMATION

(75) Inventor: George Howard Messick, Jr., E. New Market, MD (US)

(73) Assignee: Maryland Wire Belts, Inc., Church Creek, MD (US)

( * ) Notice: Subject to any disclaimer, the term of this patent is extended or adjusted under 35 U.S.C. 154(b) by 31 days.

(21) Appl. No.: 09/759,269

(22) Filed: Jan. 16, 2001

(65) Prior Publication Data

US 2002/0092737 A1 Jul. 18, 2002

(51) Int. Cl.[7] ............................................... B65G 15/54
(52) U.S. Cl. ....................................................... 198/848
(58) Field of Search ........................................ 198/848

(56) References Cited

U.S. PATENT DOCUMENTS

| | | | |
|---|---|---|---|
| 2,826,383 A | 3/1958 | Spencer, Jr. ................ | 198/848 |
| 2,862,602 A | 12/1958 | Greer et al. ................ | 198/848 |
| 3,159,267 A | 12/1964 | Jeffrey ......................... | 198/848 |
| 3,494,456 A * | 2/1970 | Peterson ..................... | 198/848 |
| 3,767,034 A * | 10/1973 | Teagle ..................... | 198/848 X |
| 3,794,155 A | 2/1974 | Bechtel, Jr. ................ | 198/848 |
| 4,410,083 A | 10/1983 | Poerink ....................... | 198/853 |
| 4,643,129 A | 2/1987 | Sari ........................ | 198/848 X |
| 4,754,871 A | 7/1988 | Gustafson ................... | 198/848 |
| 4,846,339 A | 7/1989 | Roinestad ................... | 198/852 |
| 5,404,998 A | 4/1995 | Frye ............................ | 198/848 |
| 5,908,106 A | 6/1999 | Krueger ...................... | 198/848 |
| 5,950,807 A | 9/1999 | Greer .......................... | 198/850 |
| 6,102,196 A | 8/2000 | Domit, Jr. .................. | 198/848 |
| 6,325,205 B1 * | 12/2001 | Heyde .................... | 198/848 X |

FOREIGN PATENT DOCUMENTS

| | | |
|---|---|---|
| DE | 1756388 | 3/1970 |
| JP | 06-305532 | 11/1994 |
| JP | 08-091524 | 4/1996 |
| JP | 11-005609 | 1/1999 |

OTHER PUBLICATIONS

Flyer, "Wirebelt™ Product Line," Wire Belt Company of America, Londonderry, NH, 1996.

* cited by examiner

Primary Examiner—James R. Bidwell
(74) Attorney, Agent, or Firm—Burns, Doane, Swecker & Mathis, L.L.P.

(57) ABSTRACT

A wire belt comprising having a plurality of wire strands, each of the plurality of wire strands being linked with at least one adjacent wire strand in the wire belt. Each of the plurality of wire strands includes a first end, a second end, and a plurality of linking portions between the first and second ends. The plurality of linking portions are linked with respective linking portions in at least one adjacent wire strand so as to form a plurality of joints in the wire belt. Each of the plurality of linking portions includes a compound Z-shape formation.

20 Claims, 4 Drawing Sheets

WIRE BELT WITH COMPOUND LINK FORMATION

TECHNICAL FIELD

The present invention relates to wire belts and in particular, to a wire belt having a compound linking portion formation.

BACKGROUND OF THE INVENTION

Wire belts are commonly used for conveying articles during cooling, drying, coating, cooking and many other applications. In one particular application, during the processing of poultry, wire belts are utilized for breading and battering lines wherein the product to be conveyed is first covered with batter, then covered with a breading, and finally transported to an oven for baking. Wire belts are advantageous for this and other types of food processing applications because they provide an open, flow-through mesh, a high degree of flexibility, a sanitary construction, simple installation and maintenance, and the ability to be positively driven. As the demands of production increase, however, the amount of product conveyed must be increased and the wire belt must support heavier loads and be driven faster, resulting in an increased strain on the wire belts. Existing wire belts have been unable to satisfactorily meet this increased production requirement.

Existing wire belts 10, as shown in FIG. 1, are typically made of interlocking wire links 12 that form the open mesh and provide a flexible belt that is suited to the above applications. The wire links 12 of existing wire belts 10 include linking portions 14 that are interlocked or linked with linking portions 14 of an adjacent wire link 12.

Each of the wire links 12, as shown in FIG. 2, is formed by a zig-zag strand of wire, generally one-half to three-quarter hard 302 stainless steel. The wire link 12 has an undulating shape, such as a modified square sine wave shape. The linking portions 14 of the wire links are defined by the zig-zag or Z-shaped elements spaced along the length of the wire link. The Z-shaped linking portions 14 of adjacent wire links 12 are joined together so as to form a continuous conveyor belt having a predetermined length. The interlocked linking portions 14 form a number of joints 16 and open spaces 18 in the wire belt 10. The open spaces 18 are defined by the distance between adjacent wire links 12, generally expressed as the number of strands per foot or the "pitch" (P) of the belt, and the "spacing width" (A) of the linking portions 14. The "mesh" of a wire belt 10 is defined as a combination of the pitch P and wire diameter.

The open spaces 18 defined between the plurality of rows or wire links 12 of the belt 10 allow the belt to bend around a sprocket or roller in the direction of travel. This bending of the wire belt 10 is also referred to as hinging. Similarly, when the wire belt is caused to bend around a sprocket or roller in a direction opposite to the direction of travel, the wire belt is said to be in a reverse bend.

The interlocking of the Z-shaped linking portions 14 produces a small gap 20 between the linking portion 14 of a first wire link and the mating linking portion 14 of an adjacent wire link. This small gap 20 is shown in an enlarged view in FIG. 3 for clarity. The gap between the linking portions 14 of adjacent wire links 12 allows the wire belt 10 to shift laterally as it is running and thus mis-track such that the conveyor belt does not run straight. The interaction of the Z-shaped linking portions 14 also causes the wire links to stress one another along the contact points therebetween when the conveyor belt traverses a shaft, sprocket, or other conveying element. The increased stress encountered in turns leads to metal fatigue and premature failure of the wire belt. It is a common occurrence therefore that production must be shut down to fix the broken wire links in the wire belt and to replace prematurely damaged belts in processing lines.

A further problem associated with conventional wire belts concerns edge damage. As a conveyor belt runs, over time the gap 20 between the linking portions 14 accumulates to one side of the wire belt 10. In order to compensate for the lateral shifting of the conveyor belt, manufacturers of such belts have generally recommended that the linking portions 14 be spaced at least one-eighth inch from the sprockets of the conveyor belt. In this way, as the belt laterally shifts during use, the danger of the linking portions becoming entangled within a sprocket or other driving element is reduced. The edge loop 22 on the edge of the wire belt 10, however, still experiences a significant degree of movement which results in edge loop flaring as the open loops continually catch on the conveyor belt rails or other components. Accordingly, there is a need for a wire belt having an increased belt strength and longer belt life to provide product support during the conveyance thereof, such as in the processing of food.

SUMMARY OF THE INVENTION

In order to overcome the deficiencies of prior wire belts, the present invention features a wire belt with an increased belt strength and resultant extended belt life. The wire belt includes a plurality of wire strands each of which is linked with at least one adjacent wire strand in the wire belt. Each wire strand includes a first end and a second end and a plurality of linking portions between the first end and the second end. The plurality of linking portions are linked with respective linking portions in an adjacent wire strand forming a plurality of joints in the wire belt. Each of the plurality of linking portions includes a compound Z-shape formation, which preferably includes an upper member, a compound angle diagonal member, and a lower member.

In a further aspect of the present invention, the compound angle diagonal member includes a first member, a central member extending therefrom, and a second member extending from the central member, with the first member and the central member forming a first included angle and the central member and the second member forming a second included angle. The first included angle and the second included angle may be substantially the same, and in a preferred embodiment the first included angle and the second included angle are defined by an angle greater than ninety degrees and less than one hundred eighty degrees.

In a still further aspect of the invention the upper member and the compound angle diagonal member define an upper included angle and the compound angle diagonal member and the lower member define a lower included angle, with the upper included angle and the lower included angle preferably being substantially equal. The upper included angle and the lower included angle are preferably between approximately eighty degrees and approximately one hundred ten degrees, and most preferably the upper included angle and the lower included angle are approximately ninety degrees.

BRIEF DESCRIPTION OF THE DRAWINGS

These, and other, objects, features and advantages of the present invention will become more readily apparent to those skilled in the art upon reading the following detailed description, in conjunction with the appended drawings, in which.

DETAILED DESCRIPTION OF THE INVENTION

Figure 4:
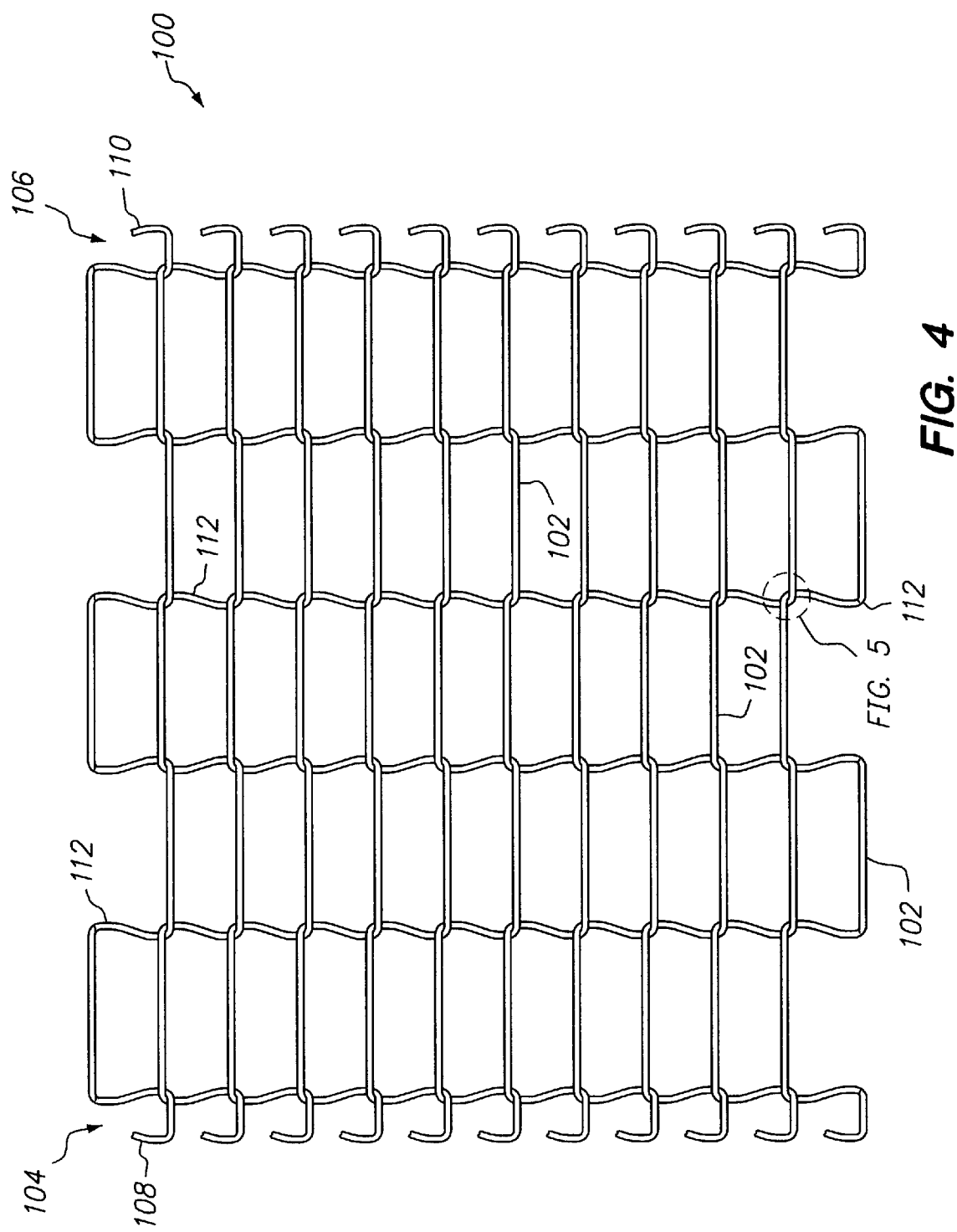
FIG. 4 is a top plan view of a wire belt according to a preferred embodiment of the present invention.

Referring to FIG. 4, a wire belt according to the present invention is shown generally by reference numeral 100. Wire belt 100 includes a plurality of wire strands 102, each of which is linked with at least one adjacent wire strand 102 to form the wire belt 100. According to one example, a plurality of wire strands 102 are interlocked or linked, by splicing together a plurality of wire strands as well known in the art, to form an endless conveyor belt. The wire belt 100 is flexible, has an open mesh, and is used to convey articles, such as food, during cooling, drying, coating, cooking and other applications.

Each wire strand 102 preferably has an undulating shape, such as a modified square wave shape and can be made of stainless steel or any other suitable metal or non-metal material. In a preferred embodiment, the wire strands 102 are formed from full hard 302 or 304 stainless steel. Each wire strand 102 includes first and second ends 104, 106 forming edges of the wire belt 100. The first and second ends 104, 106 of each wire strand 102 preferably include first and second loops 108, 110.

Each wire strand 102 also includes a plurality of linking portions 112 having a plurality of angled segments defining a compound Z-shape, as discussed in greater detail below. As shown in FIG. 4, and more clearly illustrated in the enlarged view of FIG. 5, the compound Z-shape of the linking portions creates parallel overlapping elements that increase joint stiffness, load capacity, and eliminates substantially all gaps between the linking portions 112 of adjacent wire strands 102, thereby overcoming the problem of lateral shifting experienced in the prior art.

Figure 1:
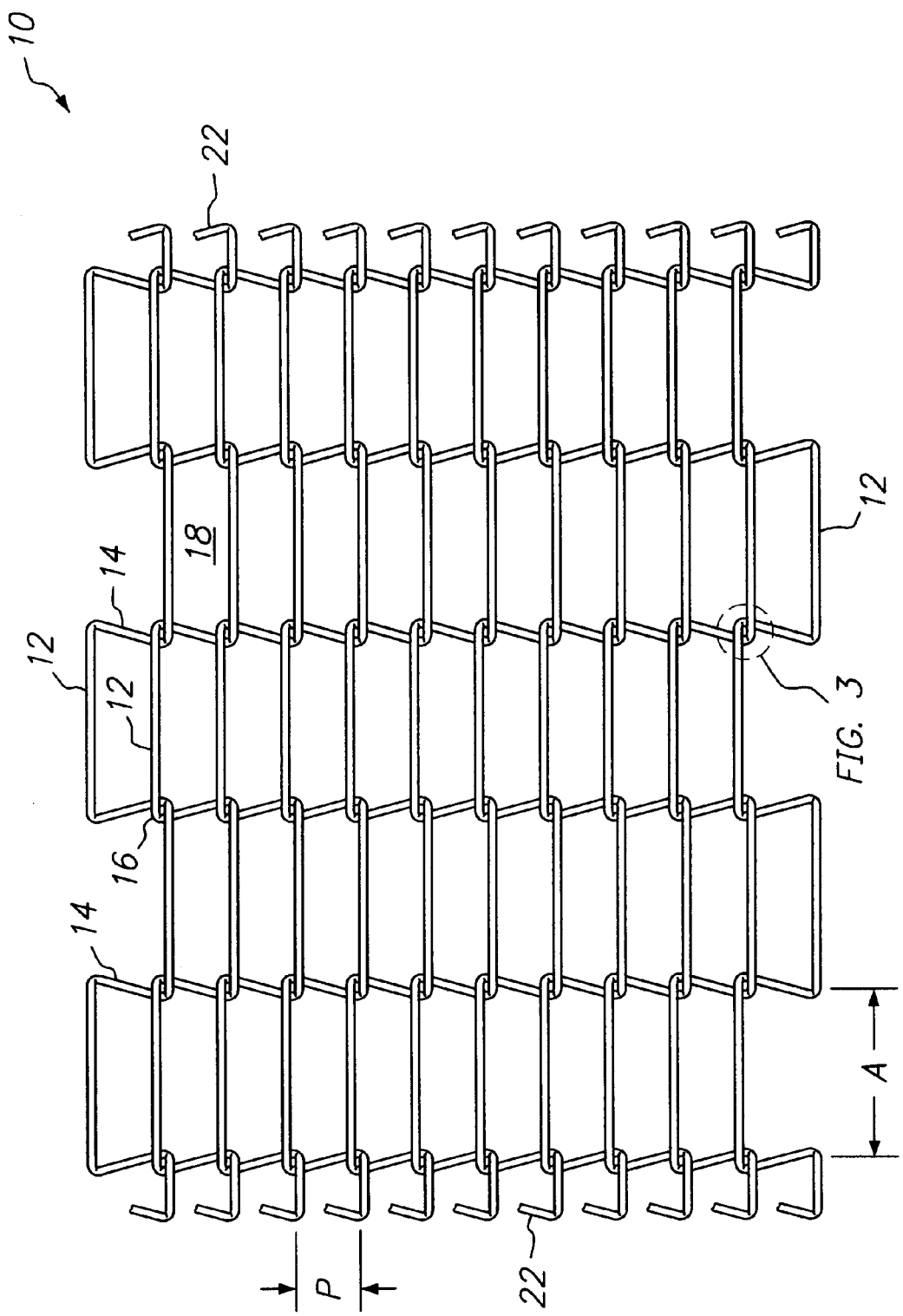
FIG. 1 is a top plan view of a wire belt as known in the prior art.
Figure 2:
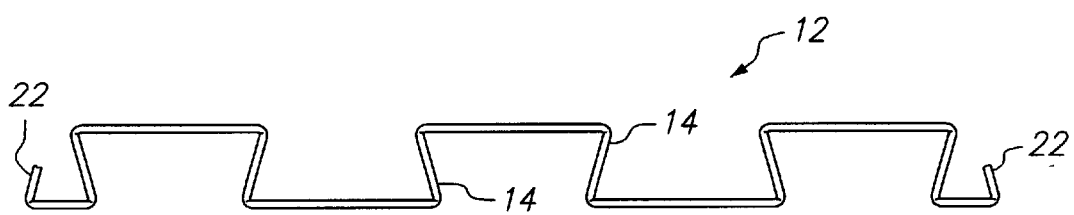
FIG. 2 is a top plan view of a wire link of the wire belt of FIG. 1, prior to the formation of a three-dimensional bend therein.
Figure 6:
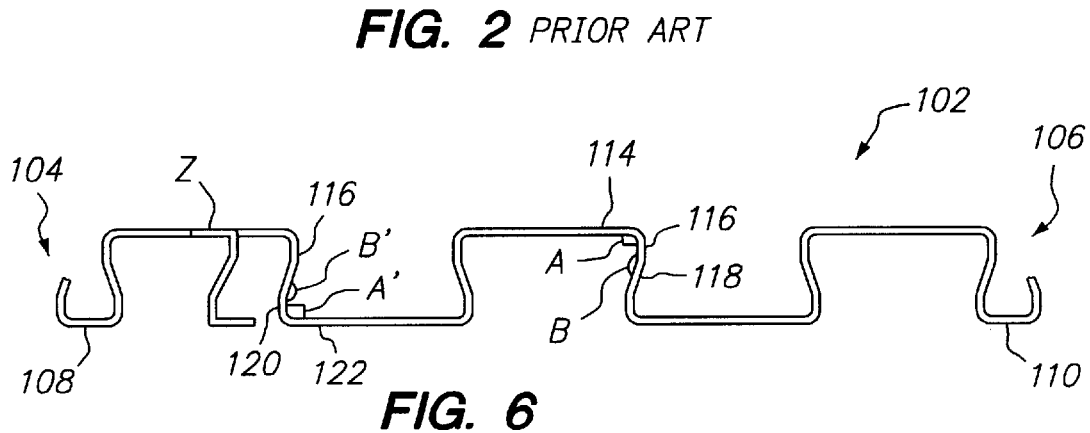
FIG. 6 is a top plan view of a wire strand of the wire belt shown in FIG. 4, prior to the formation of a three-dimensional bend therein.

FIG. 6 illustrates a single strand 102 for use in the formation of wire belt 100. FIG. 6 illustrates the wire strand in a two-dimensional plane, prior to bending of the wire strand into a three-dimensional U-shaped element, as discussed further below. For ease of understanding, a compound Z-shape has also been illustrated in FIG. 6 and denoted generally by the letter Z. Each of the linking portions 112 include a first upper member 114 which may extend generally transversely so as to define the so-called upper portion of the compound Z-shape. Each of the linking portions 112 further includes a second upper member 116 which is disposed at an angle A with respect to first upper member 114. In a preferred embodiment, angle A is generally between 70° and 110°, and most preferably angle A is equal to approximately 90° such that second upper member 116 forms a right angle with first upper member 114. Each linking portion 112 further includes a central member 118 extending from the second upper member 116 at an angle B which is generally greater than 90° and less than 180°. The angle B will vary based upon the wire diameter and belt pitch that is selected. For example, in a wire belt having 24 strands/foot, or a pitch of 0.5", and a wire diameter of 0.092", the preferred angle B is approximately 160°. The central member 118 is similarly connected to a second lower member 120 which is similarly connected to a first lower member 122, the lower members 120, 122 being mirror images of the first and second upper members 114, 116, respectively. That is, a second lower member 120 extends from a first lower member 122 at an angle A' which is generally between 70° and 110°, and most preferably a 90° angle, and central member 118 extends from second lower member 120 at an angle B, which again is greater than 90° and less than 180°, depending on the selected variables for the wire belt. Thus, in contrast to the simple zig-zag or Z-shape of the prior art, the wire strands of the present invention demonstrate a plurality of angles forming the above-defined compound Z-shape.

Figure 7:
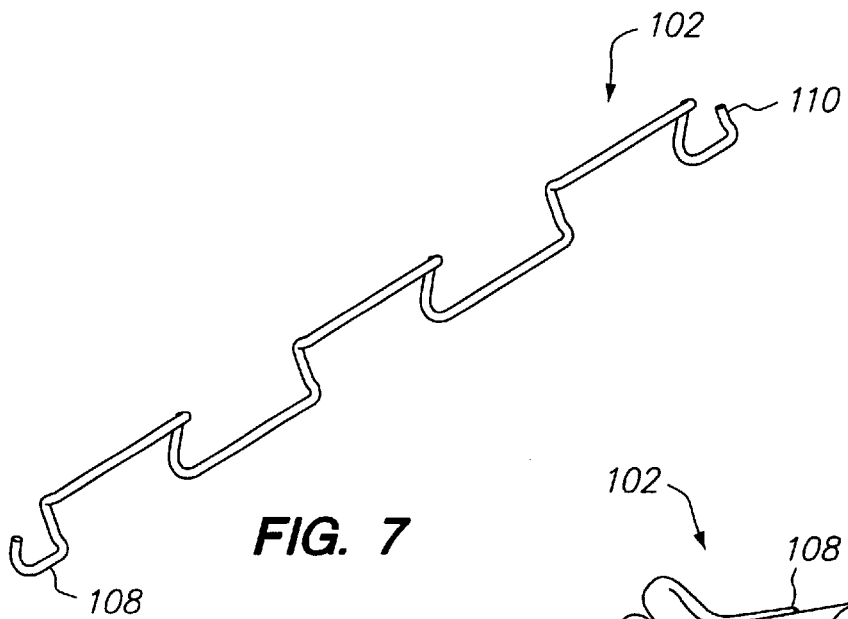
FIG. 7 is a perspective view of the wire strand of FIG. 6 after formation of a three-dimensional bend therein.
Figure 8:
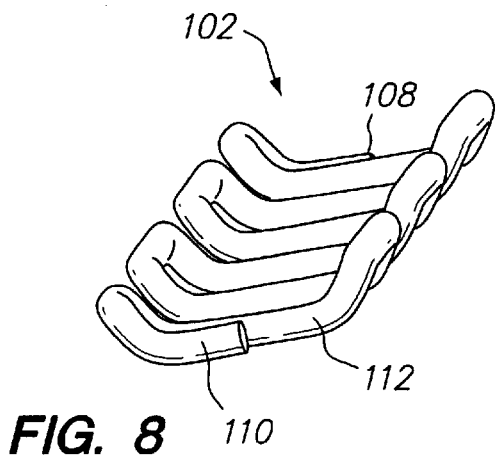
FIG. 8 is an end perspective view thereof.
Figure 3:
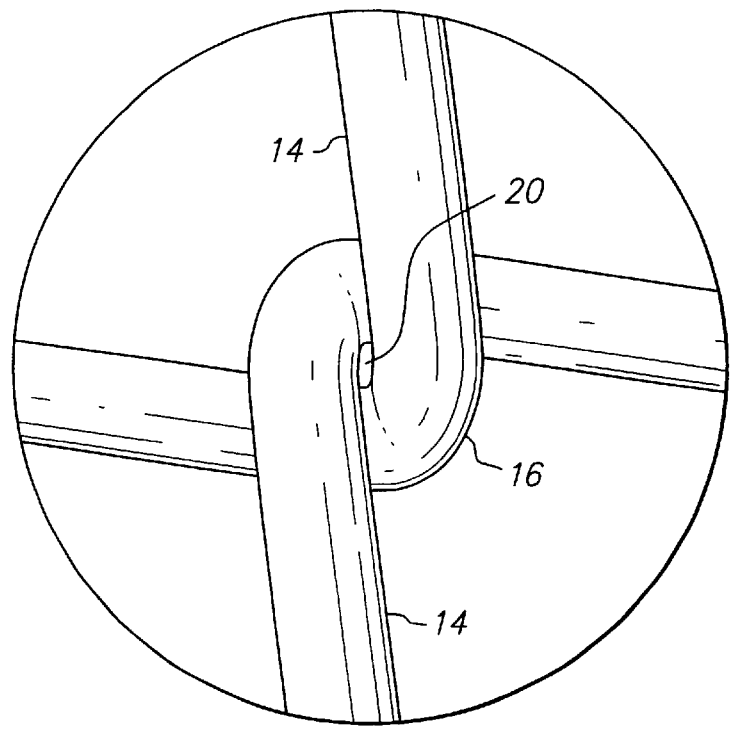
FIG. 3 is an enlarged view of detail A shown in FIG. 1.
Figure 5:
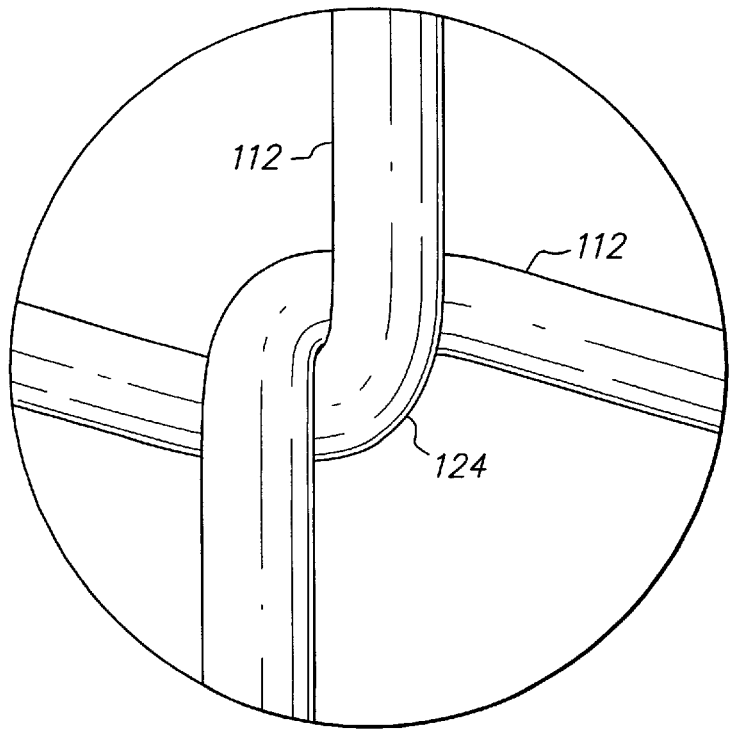
FIG. 5 is an enlarged view of detail B shown in FIG. 4.

After bending the wire strand 102 to form the undulating pattern described above, the wire strand is further shaped into a generally U-shaped configuration to thereby add the third dimension to the wire strand, as shown generally in FIG. 7 and in even greater detail in FIG. 8. The formation of the wire strands 102 into a generally U-shaped configuration, in combination with the formation of the compound Z-shaped linking portions, enables the linking portions 112 to have a tight, interfitting joint 124, which does not suffer from the drawbacks of wire strand interference, wire fatigue and subsequent wire breakage associated with the prior art wire belt configurations. More particularly, as illustrated in FIG. 5, without the presence of a gap in the joint 124 between the linking portions 112 of the adjacent wire strands, a consistent hinging or bending of the belt is assured without lateral shifting movement as encountered in the prior art. Accordingly, since there is substantially no danger that the wire belt 100 will shift and cause the linking portions 112 to move into a sprocket or other drive element, the sprockets can therefore be immediately adjacent to a linking portion 112 without risk of damage thereto. The tightness of the joint 124 between the wire strands 102 also enables a wire belt 100 to achieve and operate at a substantially tighter reverse bend than that previously known in the prior art. In one embodiment of the present invention, having a 0.5" pitch for example, the conveyor belt 100 can be rolled up to obtain a diameter of approximately 2.5", and is thus rated to have a reverse bend diameter of approximately 2.75". In contrast, the typical wire belt of the prior art is known to achieve a roll up diameter of approximately 2.75", but to the constraints of operating the belt under tension, it is rated with a reverse bend only on the order of only 5". Thus, the increased reverse bend rating of the conveyor belt of the present invention allows a conveyor to be assembled in a more compact arrangement thus requiring less space and less belt in order to achieve the same path of travel.

As shown most clearly in FIG. 8, the U-bending or three-dimensional bending of the wire strands 102 in the present invention extends not only to the linking portions 112 and the wire links therebetween, but also to the first and second edge loops 108, 110. The edge loops 108, 110 are crimped consistent with the crimp or bend found in the wire strand 102 and the wire belt 100 such that they are not likely to catch on the adjacent rails of the conveyor. As a result, wire belt 100 holds its form and does not suffer from belt edge curl and edge loop flaring. Accordingly, the risk of the belts catching on one another, on support structures, or on conveyor framework and causing catastrophic belt failure as often was the case in prior wire belt environments, is substantially eliminated.

As noted above, wire belt 100 of the present invention is preferably formed using a full hard stainless steel, whereas the wire belts of the prior art have generally been formed using only one-half or three-quarters hard stainless steel. By using a stronger, fatigue resistant stainless steel to manufacture wire belt 100 of the present invention, product loss resulting from metal contamination is significantly reduced. In addition, the improved hinging of the linking portions 112 of the present invention, i.e., the elimination of the interference between the linking portions through elimination of the gap and creation of parallel overlapping elements, reduces metal fatigue, breakage and metal pieces and dust that could ultimately end up in the conveyed product. As a result, profitability increases because there are fewer product rejects and there are also fewer potential interventions by the U.S. Department of Agriculture.

While the present invention has been described with preferred embodiments, it is to be understood that variations and modifications may be resorted to as will be apparent to those skilled in the art. Such variations and modifications are to be considered within the purview and the scope of the claims appended hereto.

What is claimed is:

1. A wire belt comprising:
   a plurality of wire strands, each of said plurality of wire strands being linked with at least one adjacent wire strand in said wire belt, each of said plurality of wire strands comprising:
      a first end and a second end; and
      a plurality of linking portions forming an undulating shape between said first end and said second end, said plurality of linking portions being linked with respective linking portions in said at least one adjacent wire strand so as to form a plurality of joints in said wire belt, said plurality of linking portions including a compound Z-shape formation defined by a plurality of angled segments.

2. The wire belt of claim 1 wherein said undulating shape is a substantially modified square wave.

3. The wire belt of claim 1 wherein said compound Z-shape formation includes an upper member, a compound angle diagonal member, and a lower member.

4. The wire belt of claim 3 wherein said compound angle diagonal member includes a first member, a central member extending therefrom, and a second member extending from the central member.

5. The wire belt of claim 4 wherein said first member and said central member form a first included angle and wherein said central member and said second member form a second included angle.

6. The wire belt of claim 5 wherein said first included angle and said second included angle are substantially the same.

7. The wire belt of claim 6 wherein said first included angle and said second included angle are defined by an angle greater than ninety degrees and less than one hundred eighty degrees.

8. The wire belt of claim 7 wherein said first included angle and said second included angle are approximately one hundred sixty degrees.

9. The wire belt of claim 3 wherein said upper member and said compound angle diagonal member define an upper included angle and compound angle diagonal member and said lower member define a lower included angle.

10. The wire belt of claim 9 wherein said upper included angle and said lower included angle are substantially equal.

11. The wire belt of claim 10 wherein said upper included angle and said lower included angle are between approximately seventy degrees and approximately one hundred and ten degrees.

12. The wire belt of claim 11 wherein said upper included angle and said lower included angle are approximately ninety degrees.

13. The wire belt of claim 7 wherein said upper member and said compound angle diagonal member define an upper included angle and compound angle diagonal member and said lower member define a lower included angle.

14. The wire belt of claim 13 wherein said upper included angle and said lower included angle are substantially equal.

15. The wire belt of claim 14 wherein said upper included angle and said lower included angle are between approximately seventy degrees and approximately one hundred and ten degrees.

16. The wire belt of claim 15 wherein said upper included angle and said lower included angle are approximately ninety degrees.

17. The wire belt of claim 1 wherein said joints define an interlocking parallel hinge having substantially no space between said linking portions.

18. The wire belt of claim 1 wherein said first end and said second end of each of said wire strands forms an edge loop, said edge loops being curved in a third dimension so as to define a generally U-shape.

19. A wire belt comprising:
   a plurality of wire strands, each of said plurality of wire strands being linked with at least one adjacent wire strand in said wire belt, each of said plurality of wire strands comprising:
      a first end and a second end; and
      a plurality of linking portions between said first end and said second end, said plurality of linking portions being linked with respective linking portions in said at least one adjacent wire strand so as to form a plurality of joints in said wire belt, said plurality of linking portions including a compound angle diagonal member having an upper portion, an angled central portion, and a lower portion, said upper portion and said angled central portion defining a first included angle with said lower portion and said angled central portion defining a second included angle, said first and second included angles being greater than approximately ninety degrees and less than approximately one hundred eighty degrees.

20. A method of forming a wire belt comprising:
   providing a plurality of wire strands,
   bending each of said plurality of wire strands in at least one of a first and a second dimension and forming a plurality of linking portions between a first end and a second end, said first end including a first edge loop and said second end including a second edge loop;
   bending each of said plurality of wire strands to form a third dimensional bend;
   linking said plurality of linking portions with respective linking portions in at least one adjacent wire strand so as to form a wire belt of a predetermined length.

* * * * *

(12) EX PARTE REEXAMINATION CERTIFICATE (5264th)
United States Patent
Messick, Jr.

(10) Number: US 6,530,469 C1
(45) Certificate Issued: Jan. 31, 2006

(54) WIRE BELT WITH COMPOUND LINK FORMATION

(75) Inventor: George Howard Messick, Jr., E. New Market, MD (US)

(73) Assignee: Maryland Wire Belts, Inc., Church Creek, MD (US)

Reexamination Request:
No. 90/006,766, Aug. 28, 2003

Reexamination Certificate for:
Patent No.: 6,530,469
Issued: Mar. 11, 2003
Appl. No.: 09/759,269
Filed: Jan. 16, 2001

(51) Int. Cl.
*B65G 15/54* (2006.01)

(52) U.S. Cl. ...................................................... 198/848

(58) Field of Classification Search ........................ None
See application file for complete search history.

(56) References Cited

PUBLICATIONS

Wire Belt Company of America, Wirebelt Product Catalog, 1996, Cover page, Londonderry, NH USA.
Wire Belt Company of America, Wirebelt Product Line, 1996, Cover page and inside page—Compound Belt, Londonderry, NH USA.
TWENTEBELT, Wire Mesh Belt Product Catalog, Jan. 4, 2000, Hengelo, Netherlands.
Wire Belt Company of America, Flat Flex Product Catalog, 72, Winchester, MA USA.
Märtens Conveyor Belts, Product Catalog, Mar. 1999, Flensberg, Germany.

*Primary Examiner*—Eileen Lillis

(57) ABSTRACT

A wire belt comprising having a plurality of wire strands, each of the plurality of wire strands being linked with at least one adjacent wire strand in the wire belt. Each of the plurality of wire strands includes a first end, a second end, and a plurality of linking portions between the first and second ends. The plurality of linking portions are linked with respective linking portions in at least one adjacent wire strand so as to form a plurality of joints in the wire belt. Each of the plurality of linking portions includes a compound Z-shape formation.

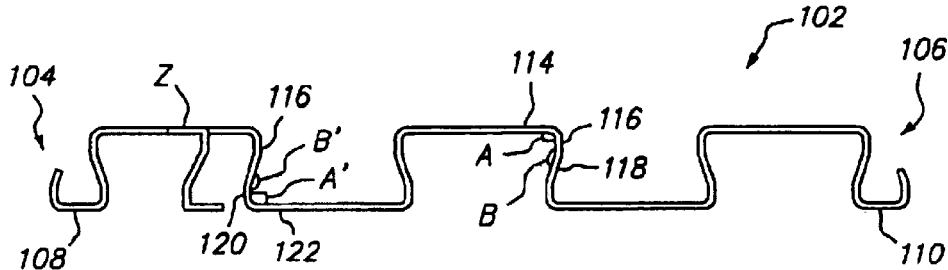

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–19 is confirmed.

Claim 20 is cancelled.

\* \* \* \* \*